June 3, 1952     W. BORZAGE     2,599,088
ACCORDION WITH REEDLESS WIND INSTRUMENTS
Filed Feb. 15, 1949     3 Sheets-Sheet 1

INVENTOR.
WILLIAM BORZAGE
BY
J. Richard Paris.
ATTORNEY

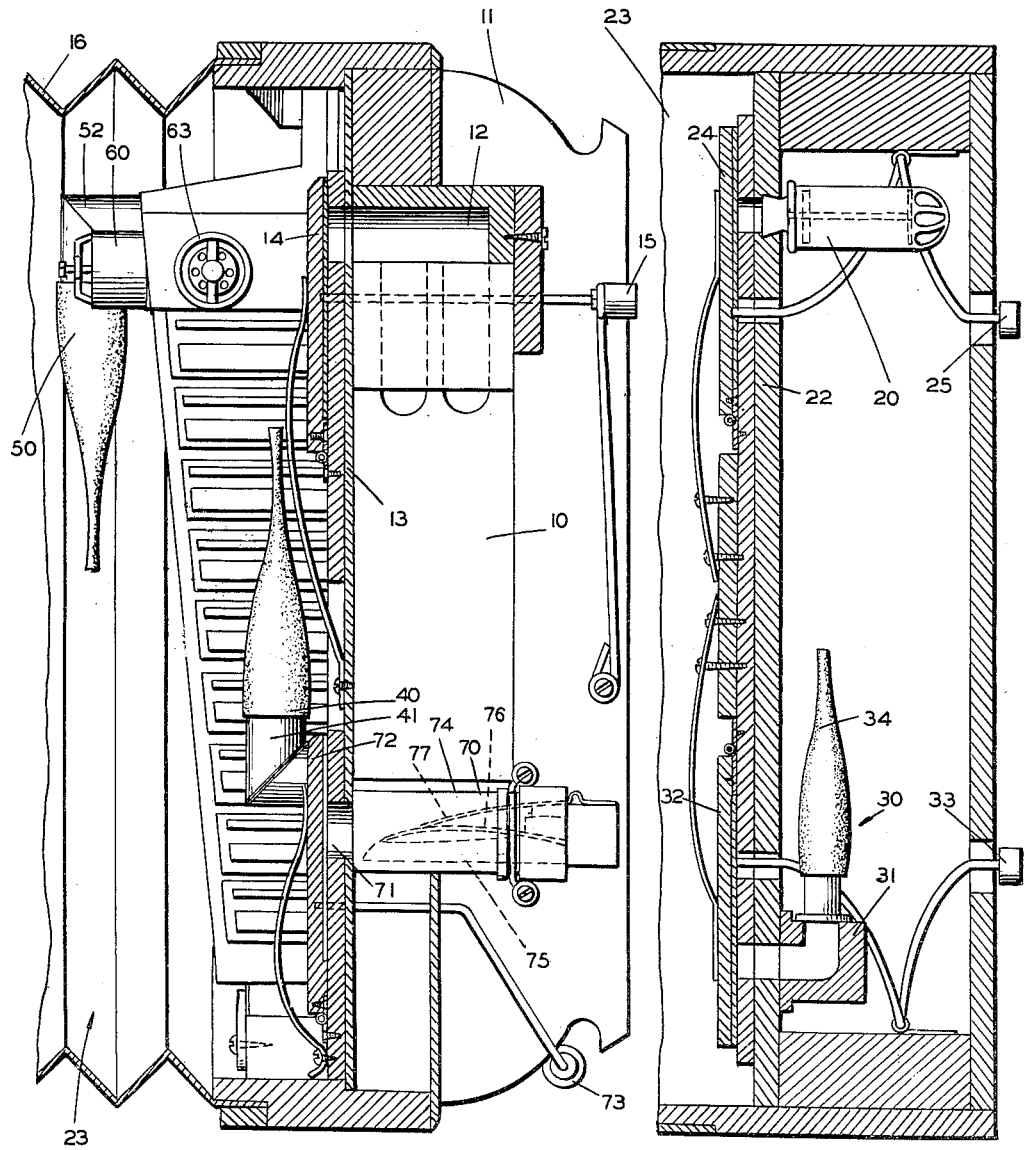

June 3, 1952 W. BORZAGE 2,599,088
ACCORDION WITH REEDLESS WIND INSTRUMENTS
Filed Feb. 15, 1949 3 Sheets-Sheet 3
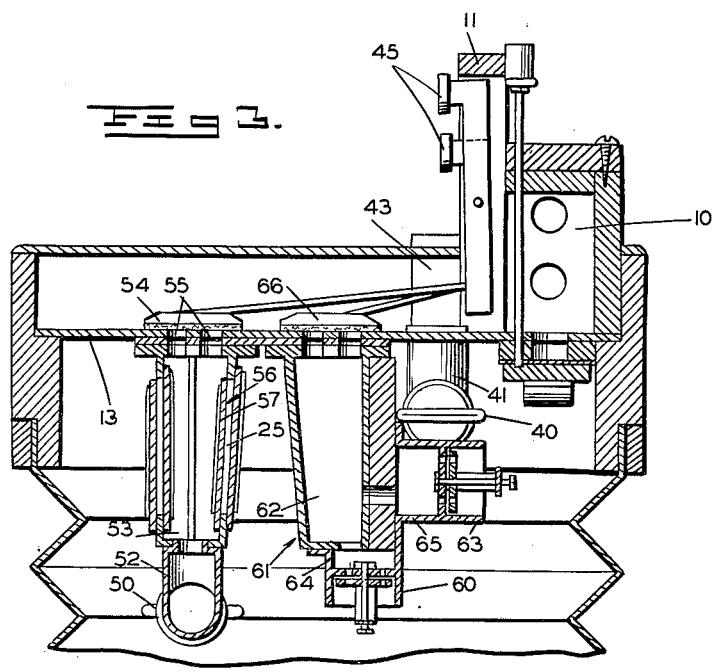
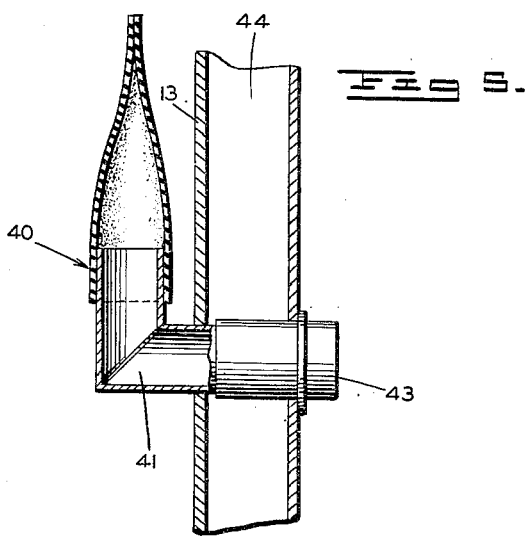
INVENTOR.
WILLIAM BORZAGE
BY
J. Richard Paris
ATTORNEY Patented June 3, 1952

2,599,088

UNITED STATES PATENT OFFICE 2,599,088

ACCORDION WITH REEDLESS WIND INSTRUMENTS

William Borzage, Los Angeles, Calif.

Application February 15, 1949, Serial No. 76,569

5 Claims. (Cl. 84—376)

The present invention relates to improvements in that class of musical instruments in which sound of music is produced by means of manually operable bellows through a series of properly designed pipes or against a series of properly designed reeds, and more particularly relates to accordions and to the incorporation in such an instrument of a series of additional wind instruments which have become essential parts of the modern jazz orchestra.

One object of the present invention is to incorporate within an accordion a series of whistles, sirens, razzes, crow calls, and the like wind instruments.

Another object of the present invention is to incorporate such wind instruments within the conventional accordion in such a manner as to permit their selective or combined operation in the normal manipulation of the accordion or similar instrument at any desired point in the music being played.

Another object is to produce novel sound effects by incorporating such wind instruments with desired reeds of said accordion.

The ordinary accordion has bellows and reed chests composed of a series of reed chambers mounted upon base boards. On the outside of each base board is an end chamber within which the reed valves are located, and on the outside of said chambers are key boards of various types upon which the valve keys are mounted. To accomplish the foregoing objects, several of the above mentioned wind instruments are mounted within the end chambers upon the base boards and provided with wind passages to the bellows chamber; others are mounted within the bellows chamber upon the base boards and provided with wind passages to the outside; some are mounted on the reed chests in conjunction with the reeds; while others are mounted on the outside frame of the accordion and provided with wind passages to the bellows chambers. These various additions to the accordion may be provided with valves and valve keys as desired and according to the effects desired.

The specific embodiment of the invention hereinbelow described in detail in conjunction with the accompanying drawings is presented by way of illustration and not limitation.

In the drawings:

Fig. 2 is a sectional view of one end of the accordion taken on line 2—2 of Fig. 1;

Fig. 3 is a sectional view of the same end of the accordion taken on line 3—3 of Fig. 1;

Fig. 4 is a sectional view of the other end of the accordion showing additional wind instruments mounted on the base board within the end chamber;

Fig. 5 is a sectional view of a razz taken on line 5—5 of Fig. 1.

Figure 1:
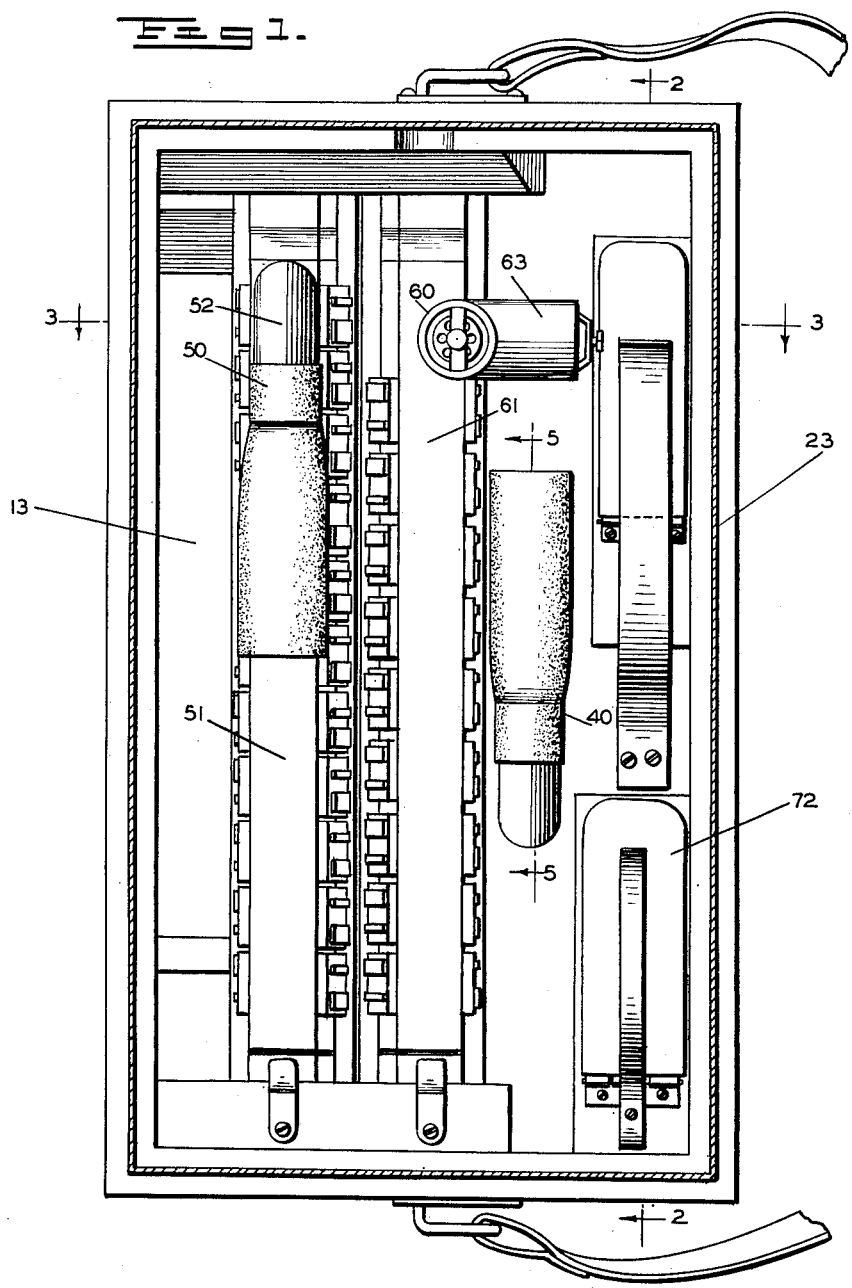
Fig. 1 is a face view of a base board at one end of the bellows chamber showing the reed chests and several additional wind instruments.

The embodiment of the present invention illustrated in the drawings shows a conventional accordion upon which several additional wind instruments have been attached. A whistle and a crow call are attached to the outside frame of the accordion and have wind passages to the bellows chamber and key operated valves to control them. In one end chamber, a siren and razz have been mounted on the base board and provided with wind passages to the bellows chamber and key operated valves to control them. A second razz is mounted within the bellows chamber and attached to the other base board and is provided with a valveless wind passage to the corresponding key board where the player may control the razz by finger pressure upon the opening of the wind passage. At the same end of the bellows chamber, and mounted on the reed chests are a pair of sirens and a third razz. The pair of sirens have been mounted to replace a pair of low toned reeds and are provided with the original reed wind passage, valve, and valve key for control thereof. The second razz is mounted on a reed chamber and operates in conjunction with the reeds of that chamber and is controlled by the same wind passage and valve as those reeds.

The whistle 10, designed to imitate a train whistle, is located on the bottom of the keyboard 11, having a wind passage 12 leading through the base board 13 into bellows chamber 23, having a valve 14, and a valve key 15. In this arrangement the whistle will operate on compression of the bellows 16 and opening of the valve 14 by means of key 15.

Siren 20 is mounted on the other base board 22. This siren is provided with a wind passage through the base board 22 to the bellows chamber 23, and it is further provided with a valve 24 at the bellows chamber end of its wind passage and a key 25 for controlling the operation thereof. This siren will operate upon either compression or extension of the bellows when valve 24 is opened.

A razz 30 is located on the same base board and in the same end chamber as siren 20. This razz is affixed to a base 31 and is provided with a wind passage through said base and base board into the bellows chamber 23, and it is further provided with a valve 32 at the bellows chamber end of its wind passage and a key 33 for control thereof. Since the razz is constructed of relatively heavy flattened rubber tubing 34 it will not permit air to pass from the outside into the bellows chamber, but will operate only when air is forced through the tubing from the bellows chamber to the outside upon compression of the bellows and opening of valve 32.

The three foregoing instruments and their combination with an accordion has been fully described in Patent No. 1,830,086 issued to me on November 3, 1931. In addition to these, the present invention includes several other novel combinations of wind instruments with the accordion. In the bellows chamber and mounted on the base board 13 is a second razz 40 having a base 41 attached to the base board 13 and having a valveless wind passage 43 leading through the end chamber 44 to the outside of the accordion to a position just above the keys 45 and key board 11. For the same reasons as apply to the first razz, its construction does not permit its operation except on extension of the bellows, when air passes from outside the accordion, through the wind passage and the razz, into the bellows chamber.

A third razz 50 is mounted in the bellows chamber on the reed chest 51 and is connected by pipe 52 with the interior of reed chamber 53. This razz is so connected with this reed chamber as to enable it to be played in conjunction with the reeds of that chamber. It will readily be seen by reference to Fig. 3 that on opening valve 54 and extending the accordion bellows, air will enter through openings 55 into reed chamber 53 then pass through the reed slots 56 into the bellows chamber causing the reeds 57 to vibrate and produce musical sound. Simultaneously, some of the air entering the reed chamber will pass through pipe 52 and then through razz 50 causing a razz sound to be emitted along with the musical sound of reeds 57. But on compression of the bellows the razz will be closed to the passage of air, as explained above, and if the valve for this reed chamber is opened, the other pair of reeds of this chamber designed to operate upon this compression will so without the razz. These latter reeds have been chosen as out of tune reeds giving the effect of a streamlined train whistle. Instead of a razz, other wind instruments may be combined with these reeds in a similar manner.

A pair of sirens 60 and 63 are mounted in the bellows chamber on another reed chest 61 in place of the lowest toned reeds, occupying reed chamber 62 in the usual accordion, which are seldom needed in the normal use of an accordion. In this case the reeds have been removed and the reed slots closed. Two suitable openings are made in this reed chamber to receive bases 64 and 65 upon which the two sirens are mounted. These sirens may be operated in unison at any desired time by either extending or compressing the bellows and opening the valve 66 provided for this reed chamber by its key.

A crow call 70 is mounted on the underside of the keyboard 11 and has a wind passage 71 to the bellows chamber with a valve 72, controlled by key 73. The crow call is a conventional instrument having an external tube 74 with another tube 75 inserted therein. The latter tube is provided with a reed 76 overlying a portion of the wind passage therein and having a variable stop 77 contacting the reed so that as the variable stop is moved along the reed sounds of varying pitch will be produced. This instrument is attached to the accordion to operate on compressing the bellows when its key operated valve 72 is open. During its operation the stop 77 is moved to cause a variation in pitch, thus resembling the call of a crow.

Thus this accordion may be used in its normal way and in addition various sound effects may be included when desired. For example, when extending the accordion bellows during the normal playing of this instrument, at any point in the music a razz sound may be introduced by removing the finger from the wind passage of razz 40; or a peculiar razz effect may be obtained by operating the valve key controlling the razz 50 and the low toned reeds associated therewith; or the double sirens 60 and 63 may be played by operating the proper key giving the effect of approaching police or fire cars, or an air raid warning, or the like; or the single siren 20 may be played by operating its controlling key. On compressing the bellows, other sound effects may be produced at any point in the music as for example, the whistle 10 may be operated by use of its controlling key; or the razz 30 may likewise be caused to operate; or the two out of tune reeds, contained in the same reed chamber as the razz 50 and its associated reeds, may be caused to play giving the effect of a streamlined train whistle, for example, if the proper tones are chosen; either the pair of sirens 60 and 63 or the single siren 20 may be played; and in addition, the crow call 70 may be played.

Of the above musical sound effects, enumerated only by way of example and not of limitation, any one may be played individually or suitable ones may be played together producing various sorts of novel and interesting effects. It will be readily observed that in this new and improved combined instrument, the instruments for some of the more commonly used sounds, as for example, the razz and the sirens, have been so arranged as to permit of their ready use at any point in the music being played regardless of whether the bellows is being extended or compressed at that particular time. This improvement over my prior patent presents a decided advantage, particularly in the case of one way operating instruments as the razz. The razz, as indicated above, because of the nature of its construction, its flattened end of rubber tubing, permits the passage of air upon which its operation depends in only one direction. Therefore, formerly it would sometimes be necessary to change the direction of operation of the bellows in order to introduce the sound of the razz at the proper point. This causes much annoyance and distraction to the operator and detracts from the musical effect desired. According to the present invention this difficulty has been obviated by using at least two razzes so positioned that one of them is always able to be operated regardless of whether at the desired moment the bellows is being extended or compressed.

As mentioned above, the description of the various wind instruments combined with the accordion in this specification are only by way of example. The use of other wind instruments besides those enumerated, as will be apparent to those skilled in the art, is contemplated by the present invention and within its scope. The use of the two razzes 30 and 40 in this description to illustrate the invention described above, which permits the playing of a razz at any time either on the extension or compression of the bellows, is also used only by way of illustration. It is contemplated that other one way wind instruments may be used in a similar manner, as for example could be done with the whistle 10 or the crow call 70.

I claim:

1. An accordion having a reed chest, reed chambers composing said chest, reeds within each of said chambers, a valve for each chamber, a manual key for each valve, and a reedless wind instrument mounted on said chest and having a wind passage for said instrument leading into one of said reed chambers, thereby providing for the combined playing of the reeds of said chest and said additional wind instrument by the operation of a single key.

2. An accordion having a bellows, a reed chest, reed chambers composing said chest, reeds within each of said chambers, each of said chambers having one group of reeds operating on extension of said bellows and another group of reeds operating on compression of said bellows, a valve for each chamber, a manual key for each valve, and a one way reedless wind instrument mounted on said chest and having a wind passage for said instrument leading into one of said reed chambers, whereby in one direction of movement of said bellows the combined playing of one group of reeds and said additional one way wind instrument by the operation of a single key is provided for, and in the other direction of movement of said bellows the playing of the other group of reeds without the additional instrument.

3. An accordion having a bellows, reed chest, reed chambers composing said chest, reeds within each of said chambers, each of said chambers having one group of reeds operating on extension of said bellows and another group of reeds operating on compression of said bellows, a valve for each chamber, a manual key for each valve, and a razz mounted on said chest and having a wind passage leading into one of said reed chambers, whereby in one direction of movement of said bellows the combined playing of one group of reeds and said razz by the operation of a single key is provided for, and in the other direction of movement of said bellows the playing of the other group of reeds without the razz.

4. An accordion having a bellows, a bellows chamber formed thereby, a base board at each end of said bellows, an end chamber at each end of said bellows, and substantially the usual complement of reeds, two additional one way reedless wind instruments mounted on said base boards which have a wind passage for each of said instruments, said instruments being operable by the flow of air therethrough in the direction of the end of the instrument remote from the board, at least one of said instruments having a key controlled valve, one of said instruments being within said bellows chamber and having its wind passage connecting said interiorly positioned instrument with the outside, the other of said additional wind instruments being positioned within an end chamber and having its wind passage connecting said wind instrument with the interior of said bellows chamber, said two additional one way wind instruments thereby cooperating to permit the playing of one on the extension and the other on the compression of said bellows.

5. An accordion having a bellows, a bellows chamber formed thereby, a base board at each end of said bellows, an end chamber at each end of said bellows, substantially the usual complement of reeds, and two razzes mounted on said base boards which have a wind passage for each of said razzes, said razzes being operable by the flow of air therethrough in the direction of the end of the razz remote from the board, at least one of said razzes having a key controlled valve, one razz being within said bellows chamber and having its wind passage connecting it with the outside, the other razz being positioned in an end chamber and having its wind passage connecting it with the interior of said bellows chamber, said two razzes thereby cooperating to permit the playing of one on the extension and the other on the compression of said bellows.

WILLIAM BORZAGE.

REFERENCES CITED

The following references are of record in the file of this patent:

UNITED STATES PATENTS

| Number | Name | Date |
| --- | --- | --- |
| 709,671 | Golob | Sept. 23, 1902 |
| 1,830,086 | Borzage | Nov. 3, 1931 |
| 2,230,162 | Lidblom | Jan. 28, 1941 |
| 2,295,588 | Logli | Sept. 15, 1942 |
| 2,297,032 | Stahl | Sept. 29, 1942 |